US008881872B2

(12) United States Patent
Peacock et al.

(10) Patent No.: US 8,881,872 B2

(45) Date of Patent: Nov. 11, 2014

(54) METHOD OF INSTALLING AN ELEVATOR

(75) Inventors: Mark Peacock, Riihimäki (FI); Jussi Perälä, Hyvinkää (FI); Matti Eskelinen, Hyvinkää (FI); Zhizhong Yan, Espoo (FI)

(73) Assignee: Kone Corporation, Helsinki (FI)

( * ) Notice: Subject to any disclaimer, the term of this patent is extended or adjusted under 35 U.S.C. 154(b) by 933 days.

(21) Appl. No.: 12/969,524

(22) Filed: Dec. 15, 2010

(65) Prior Publication Data

US 2011/0113720 A1 May 19, 2011

Related U.S. Application Data

(63) Continuation-in-part of application No. PCT/FI2010/000018, filed on Mar. 5, 2010.

(30) Foreign Application Priority Data

Mar. 6, 2009 (FI) ..................................... 20090085

(51) Int. Cl.

*B66B 19/00* (2006.01)
*B66B 7/00* (2006.01)
*B23P 11/00* (2006.01)
*E04G 21/14* (2006.01)

(52) U.S. Cl.

CPC ..................................... *B66B 19/00* (2013.01)
USPC ............ 187/414; 29/429; 29/469; 29/525.01; 52/741.1

(58) Field of Classification Search

CPC .... B66B 19/00; B66B 19/002; B66B 19/005; B66B 19/04
USPC ........... 29/426.3, 428, 429, 430, 469, 525.01; 187/414; 52/741.1
See application file for complete search history.

(56) References Cited

U.S. PATENT DOCUMENTS 311,783 A 2/1885 Rau et al.
3,519,101 A * 7/1970 Sieffert ......................... 187/256
(Continued)

FOREIGN PATENT DOCUMENTS

EP 1583710 A1 12/2005
FR 2 694 279 A1 2/1994
(Continued)

OTHER PUBLICATIONS

Formal translation, JP 03 264482 A, FLS, Inc., Aug. 2012, pp. 1-13.*

*Primary Examiner* — Michael Mansen
*Assistant Examiner* — Stefan Kruer
(74) *Attorney, Agent, or Firm* — Birch, Stewart, Kolasch & Birch, LLP

(57) ABSTRACT

In a method in the use of a construction-time elevator, at least two lifts are performed. In each of the lifts, the supporting platform is lifted higher in the elevator hoistway with the hoisting device supported by the support structure so as to extend the operating range of the elevator car to reach higher in the elevator hoistway. A second support structure and a second hoisting device, which are above the support structure, are used between the lifts of the supporting platform, for moving the working platform in the elevator hoistway under construction between the second support structure and the support structure, and for lifting the support structure upwards in the elevator hoistway.

17 Claims, 4 Drawing Sheets

(56) References Cited

U.S. PATENT DOCUMENTS

| | | | | |
|---|---|---|---|---|
| 3,565,217 | A | 2/1971 | St. Louis | |
| 3,759,349 | A | 9/1973 | Sieffert | |
| 3,851,736 | A * | 12/1974 | Westlake et al. | 52/745.2 |
| 3,949,969 | A | 4/1976 | Kaufer | |
| 4,193,311 | A | 3/1980 | Rinio et al. | |
| 4,651,974 | A | 3/1987 | Frommherz | |
| 5,862,886 | A | 1/1999 | Bennett et al. | |
| 6,164,418 | A | 12/2000 | Chen et al. | |
| 2002/0066622 | A1 * | 6/2002 | Pettersson et al. | 187/414 |
| 2006/0201749 | A1 | 9/2006 | Chen | |
| 2007/0170014 | A1 | 7/2007 | Woronoff et al. | |
| 2009/0101448 | A1 | 4/2009 | Korkeakangas et al. | |
| 2010/0133048 | A1 | 6/2010 | Barneman | |
| 2012/0272612 | A1 | 11/2012 | Peacock et al. | |
| 2012/0291395 | A1 | 11/2012 | Plathin | |

FOREIGN PATENT DOCUMENTS

| | | | | |
|---|---|---|---|---|
| FR | 2694279 | A1 * | 2/1994 | B66B 19/00 |
| GB | 1 194 618 | | 6/1970 | |
| JP | 03264482 | A | 11/1991 | |
| JP | 2007-238229 | A | 9/2007 | |
| JP | 2007-290799 | A | 11/2007 | |
| WO | WO 0007923 | A1 | 2/2000 | |
| WO | WO 2004/050526 | A1 | 6/2004 | |
| WO | WO 2006/010782 | A2 | 2/2006 | |

* cited by examiner

METHOD OF INSTALLING AN ELEVATOR

CROSS-REFERENCE TO RELATED APPLICATIONS

This application is a Continuation-In-Part of copending PCT International Application No. PCT/FI2010/000018 filed on Mar. 5, 2010, which designated the United States, and on which priority is claimed under 35 U.S.C. §120. PCT International Application No. PCT/FI2010/000018 claims priority to Application No. 20090085, filed in Finland on Mar. 6, 2009. The entire contents of each of the above-identified applications is hereby incorporated by reference.

BACKGROUND OF THE INVENTION

1. Field of the Invention

The present application is directed to a method in installing an elevator, which elevator is used during construction time.

2. Description of Background Art

In connection with so-called jump-lifts, the bottom part of an elevator hoistway is taken into use before the building has been completed. In this case the top part of the elevator hoistway can be constructed at the same time as an elevator moving in the bottom part of the elevator hoistway already serves people on the lower floors of the building. Generally in jump-lifts the elevator car moving in the lower parts of the elevator hoistway is supported and moved during construction-time use with a hoisting machine supported on a platform in the elevator hoistway. The installation work of this machine room platform in the upper parts of the elevator hoistway is done from a movable platform or corresponding in the elevator hoistway, which installation work comprises, among other things, the installation of guide rails and electrification in the elevator hoistway. When the elevator hoistway under construction above the machine room platform has reached a sufficient stage of completion, the completed part of the elevator hoistway can be taken into use. In this case a jump-lift is performed, wherein the machine room platform is raised higher in the elevator hoistway. A worksite crane used in the construction of the building is conventionally used for the jump-lift. One problem with this type of arrangement is that the worksite crane is not always available when needed. This type of solution is presented in, among others, publication GB1194618. Another suggested method for performing the lifting of a machine room platform in connection with a jump-lift is presented in publication EP1583710B1. In the solution in question the vertical support force needed for lifting is taken from the guide rails that are already installed, along which the load is transmitted to the building.

The weight of the machine room platforms combined with the weight of the parts of the elevator supported by the machine room has increased owing to, among other things, buildings that are taller than before. Owing to the very great travel heights of modern elevators, the machine size and rope masses, among other things, are so great that the hoisting capacity needed to perform the last jump-lifts is extremely large. For the same reason, the support needed for the lifting must be robustly made. The aforementioned solution supported on the guide rails cannot, for this reason, be used in all cases, because a weight that is heavier than the machine room platforms cannot be allocated to rest on the guide rails.

Prior-art solutions exist in which a machine room platform that supports the elevator car is lifted with a hoisting device arranged to act between the machine room platform and a support structure that is higher in the elevator hoistway. This can be e.g. a hydraulic hoist such as in publication WO0007923A1. In solutions of this type, the hoisting apparatus tends to be large in size, complex, expensive to manufacture and laborious to install.

Methods used in the above type elevator installations have multiple stages and complex requirements. The installation environment is complex, as important safety requirements, component strength and layout requirements need to be taken into account. One general problem of the existing solutions has been that the solutions tend to get complex whereby it is challenging to design the system to be sufficiently efficient.

SUMMARY OF THE INVENTION

The aim of the invention is to eliminate, among others, the aforementioned drawbacks of prior-art solutions. More particularly the aim of the invention is to produce an improved construction-time elevator arrangement and method, by utilizing which the construction-time operating range of an elevator can be extended upwards in the building. The aim of the invention is further to produce one or more of the following advantages, among others:

A solution is achieved with which very large masses can be moved with a simple arrangement.

Elevator installation is independent of the building crane.

A solution is achieved with which a heavy supporting platform of an elevator car, and the parts bearing the platform, can be moved.

A solution is achieved in which a very heavy supporting platform with the parts connected to it can be moved/supported with light hoisting devices.

A solution is achieved, the hoisting devices of which are quick to install to be ready-for-use, inexpensive and are multipurpose also in the other worksite needs of elevators.

A solution is achieved wherein the hoisting devices needed for a jump-lift are light.

A solution is achieved in which the mass of the support structure needed for moving the supporting platform is small, in which case it can be moved with light hoisting devices, e.g. with a hoisting device reserved for moving a working platform operating in the upper parts of the elevator hoistway.

A space efficient and simple method is achieved wherein it is possible to safely lift large structures simply and quickly without complicated steps or devices.

A space efficient and simple method is achieved whereby amount of necessary components can be reduced by using components to perform plurality of tasks.

A solution is achieved which improves safety of lifting of multiple different structures with simple and few components. Especially, in one aspect of the invention this is done by controlling firmly the lateral movement of structures being lifted.

The method according to the invention includes performing at least two lifts; in each of said lifts, lifting the supporting platform higher in the elevator hoistway with said hoisting device supported by the support structure so as to extend the operating range of the elevator car to reach higher in the elevator hoistway; using a second support structure and a second hoisting device, which are above the support structure, between said lifts of the supporting platform, for moving the working platform in the elevator hoistway under construction between the second support structure and the support structure, and for lifting the support structure upwards in the elevator hoistway. The method according to the invention alternatively includes lifting the supporting platform higher in the elevator hoistway with said hoisting device supported by the support structure so as to extend the operating range of the elevator car to reach higher in the elevator hoistway; after said step of lifting, lifting said support structure above the supporting platform upwards; during the method, extending said one or more guide rail lines by installing one or more guide rail section(s) on top of an already installed guide rail line; lifting said supporting platform higher in the elevator hoistway guided along said one or more guide rail lines; and moving said working platform guided along said one or more guide rail lines.

Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments can be applied within the framework of the basic inventive concept in conjunction with other embodiments.

According to the invention, the elevator arrangement, more particularly in a construction-time elevator, comprises an elevator hoistway, an elevator car, hoisting roping for moving the elevator car in the elevator hoistway, a supporting platform, which supports the elevator car below it via the hoisting roping, means for moving the hoisting roping, such as e.g. a traction sheave driven by an electric motor, movable support structures above the supporting platform in the elevator hoistway, and hoisting means, which are arranged to lift the supporting platform upwards in the elevator hoistway while being supported by the support structure. The supporting platform is, for the purpose of the lifting, suspended from the support structure by means of at least one hoisting device and rope comprised in the hoisting means with a lifting ratio of 1:x, where x is greater than 1. In this way the advantages defined above are achieved.

In one embodiment of the invention x is some value between 4-12, preferably 6, 7, 8, 9 or 10, even more preferably 6, 8 or 10, most preferably of all 8. In this way the advantages defined above are achieved. Thus hoisting devices that are small and light can be used, and however very large masses can be moved with a simple arrangement.

In one embodiment of the invention the hoisting means comprise a first hoisting device, and a second hoisting device, which are arranged to lift the supporting platform, with a rope connected to the supporting platform and to the support structure with the aforementioned lifting ratio. In this way hoisting devices that are small and light can be used, and however very large masses can be moved with a simple arrangement.

In one embodiment of the invention a first hoisting device is arranged to lift the supporting platform with a first rope connected to the supporting platform and to the support structure, and a second hoisting device is arranged to lift the supporting platform with a second rope connected to the supporting platform and to the support structure. Thus, among other things, the thickness of the rope can be kept small. In this way also the diameter of the diverting pulleys can be kept small.

In one embodiment of the invention the maximum 1:1 rated load of the hoisting device is between 500-4000 kg, preferably 1500-4000 kg, even more preferably 2000-3000 kg, e.g. 2000 or 3000 kg.

In one embodiment of the invention the hoisting means comprise two hoisting devices, and the combined maximum rated load of the hoisting means with a lifting ratio of 1:x is between 24000-48000 kg, e.g. 24000 kg or 48000 kg.

In one embodiment of the invention the hoisting device is a Tirak hoist.

In one embodiment of the invention the hoisting means comprise two hoisting devices, both of which are fixed to the supporting platform. One advantage is that the support structure is light, in which case a light hoist, preferably with 1:1 or 1:2 suspension (e.g. the second hoisting means) can be used to move it.

In one embodiment of the invention it comprises a second support structure supported on the building in the elevator hoistway above the support structure, and second hoisting means for lifting the support structure in the elevator hoistway while being supported on the second support structure, which second support structures and second hoisting means are preferably also arranged to move a working platform in the elevator hoistway under construction in the part of the elevator hoistway between the second support structure and the support structure.

In one embodiment of the invention an elevator car is fitted to travel in the elevator hoistway below the supporting platform, which elevator car serves the users of the elevator in the bottom parts of the building. In this way the elevator can function as a construction-time elevator.

In one embodiment of the invention the range of movement of the elevator car moving in the elevator hoistway below the supporting platform is over 100 m, preferably over 150 m, even more preferably over 200 m. The hoisting arrangement presented in the context of this type of solution is particularly necessary owing to the large rope masses.

In one embodiment of the invention the support structure is supported on the building and the vertical support force needed for lifting the supporting platform is arranged to be taken from the building, preferably essentially completely. In this way very large masses can be moved with a simple arrangement.

In one embodiment of the invention the support structure is supported on the wall structures of the elevator hoistway for taking the vertical support force needed for lifting the supporting platform from the building. In this way very large masses can be moved with a simple arrangement.

In one embodiment of the invention the hoisting means take essentially all the vertical support force needed for lifting via the support structure.

In one embodiment of the invention the support structure comprises support means extending inside the vertical projection of the wall of the elevator hoistway, upon which support means the support structure rests, more particularly supported by the walls of the elevator hoistway.

In one embodiment of the invention the support structure and the supporting platform each comprise support means extending inside the vertical projection of the wall of the elevator hoistway, upon which support means the support structure and the supporting platform can be placed to rest, more particularly supported by the walls of the elevator hoistway.

In one embodiment of the invention the support structure and/or the supporting platform can be moved between an extended position and a contracted position, in which extended position the support means comprised in the support structure and/or the supporting platform extends inside the vertical projection of the wall of the elevator hoistway, and in which contracted position the support means does not extend inside the vertical projection of the wall of the elevator hoistway, and each support means is preferably connected telescopically or in a folding manner to the frame structure of the support structure and/or the supporting platform.

In one embodiment of the invention the rope passes around a plurality of diverting pulleys supported on the supporting platform and around a plurality of diverting pulleys supported on the support structure, and the rope is guided to pass backwards and forwards between the diverting pulleys of the supporting platform and the support structure so that the lifting ratio is the aforementioned 1:x. In this way very large masses can be moved with a simple arrangement. The solution can be formed compactly and the length of the lifting can be freely selected.

In one embodiment of the invention the first hoisting device and the second hoisting device are disposed in opposite corners in the transverse direction of the elevator hoistway. Thus the apparatus is in balance.

In one embodiment of the invention the support structure comprises two parallel horizontal beams that are at a distance from each other and that are permanently connected to each other. Thus the support structure is robust and very large masses can be moved.

In one embodiment of the invention the hoisting rope is metal rope (most preferably so-called wire rope). The solution can be formed compactly (e.g. with respect to the diverting pulleys) and the length of the lifting can be freely selected.

In one embodiment of the invention the aforementioned two horizontal beams of the support structure that are at a distance from each other comprise a support means at both their ends, which support means can be moved in the longitudinal direction of the horizontal beam between an extended and a contracted position, preferably telescopically with the horizontal beam.

In one embodiment of the invention it comprises at least two hoisting devices and means for synchronizing the hoisting speeds of the hoisting devices. In this way the lifting can be controlled and it is safe.

In one embodiment of the invention the aforementioned means for synchronizing the hoisting speeds of the hoisting devices comprise Means for determining the hoisting speed of each hoisting device directly or indirectly, which means are preferably an apparatus, such as e.g. a tachometer, that measures the speed of a hoisting rope or corresponding.

Means for comparing the hoisting speeds of the hoisting devices, such as e.g. a control unit comprising a microprocessor.

Means for controlling the hoisting speed of the hoisting devices individually, e.g. by means of the aforementioned control unit.

A hoisting device/hoisting arrangement comprising these features can form a separate invention independently of the other features referred to in the preceding or hereinafter, in conjunction with which however these features are advantageous. One advantage is safe and controlled hoisting.

According to the invention, in the method in the use of a construction-time elevator the supporting platform that supports the elevator car of the elevator in the method is lifted higher in the elevator hoistway with hoisting means supported on a support structure. The supporting platform is suspended from the support structure via at least one hoisting device and rope comprised in the hoisting means and the supporting platform is lifted upwards in the elevator hoistway with a lifting ratio of 1:x, where x is greater than 1. In the method, advantages are achieved that correspond to the advantages defined in connection with the preceding description of the hoisting arrangement.

In one embodiment of the invention x is some value between 4-12, preferably 6, 7, 8, 9 or 10, even more preferably 6, 8 or 10, most preferably of all 8.

In one embodiment of the invention the vertical support force needed for lifting is taken from the building by means of the support structure, which is supported on the wall structures of the elevator hoistway. An advantage is that a very heavy load can be lifted.

In one embodiment of the invention before lifting the supporting platform the support structure is suspended on a second support structure and on second hoisting means in the elevator hoistway above the support structure, and the support structure is lifted upwards in the elevator hoistway.

In one embodiment of the invention between jump-lifts second hoisting means are used to move a working platform in the elevator hoistway under construction between the second support structure and the support structure.

In one embodiment of the invention two hoisting devices that lift simultaneously are used in lifting. In this way heavy loads can be lifted with light, small and inexpensive devices.

In one embodiment of the invention the hoisting speed of the hoisting devices used in the lifting are synchronized with synchronization means.

In one embodiment of the invention, an arrangement according to any of those defined above is used in the method.

In one embodiment of the invention the hoisting device/hoisting devices is/are fixed, at least during the lifting of the supporting platform, to the supporting platform immovably in relation to the supporting platform. One advantage, among others, is that the hoisting devices are in connection with the supporting platform and are thus easy to handle/use/access. Likewise the support structure can therefore be lightweight.

In one embodiment of the invention the hoisting means comprise a first hoisting device, and a second hoisting device, with which hoisting devices are lifted/which hoisting devices are arranged to lift the supporting platform, with the same rope connected to both the supporting platform and the support structure simultaneously with the same lifting ratio. In this way a compact, simple and nevertheless effective solution is achieved.

BRIEF DESCRIPTION OF THE DRAWINGS

In the following, the invention will be described in detail by the aid of some embodiments with reference to the attached drawings, wherein.

DETAILED DESCRIPTION OF THE INVENTION

Figure 1:
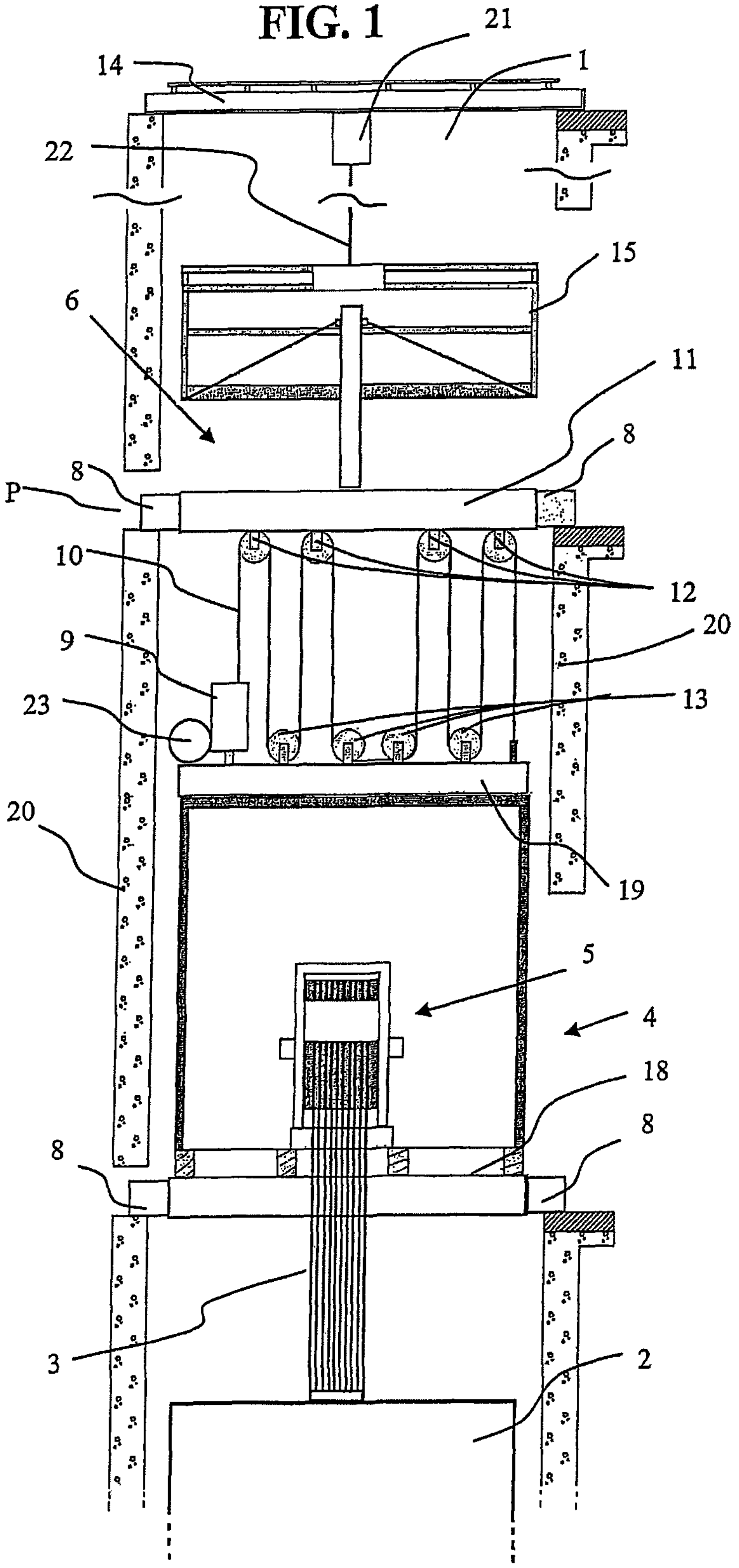
FIG. 1 presents a diagrammatic side view of a construction-time elevator arrangement of an elevator in a building according to one embodiment of the invention, in which the lifting is arranged to be performed with a method according to the invention.

FIG. 1 presents an arrangement according to the invention in a construction-time elevator. The arrangement comprises a supporting platform 4 fitted into the elevator hoistway 1, which supporting platform supports the elevator car 2 below it via hoisting roping 3, which elevator car 2 is in use to serve passengers in the lower floors of the building. When the construction of the elevator hoistway has progressed to a sufficient stage of completion, a jump-lift can be performed utilizing the arrangement for changing the range of movement of the elevator car 2 in steps so that it reaches to higher in the elevator hoistway 1. This is arranged to be performed by lifting the supporting platform upwards in the elevator hoistway 1. For this purpose the arrangement according to the invention comprises a movable support structure 6 supported on the wall structures of the elevator hoistway above the supporting platform 4, as well as hoisting means (9,9',10,10') arranged to act between the support structure 11 and the supporting platform 4, which hoisting means are arranged to lift the supporting platform 4 upwards in the elevator hoistway 1 supported by the support structure 6. The support structure 6 is supported on the wall structures 20 of the elevator hoistway 1 for taking the vertical support force needed for lifting the supporting platform 4 from the building, more particularly from its load-bearing concrete frame parts. FIG. 1 presents a situation in which the supporting platform 4 of the elevator car 2 has just been lifted upwards in the elevator hoistway 1 utilizing the arrangement according to the invention.

The supporting platform 4 is, for the purpose of the lifting, suspended from the support structure 6 via the hoisting device 9 and the rope 10 comprised in the hoisting means (9,9',10, 10') so that the rope 10 passes around a plurality of diverting pulleys supported on the supporting platform and around a plurality of diverting pulleys supported on the support structure. The rope is guided to pass backwards and forwards between the diverting pulleys 12 and 13 of the supporting platform and of the support structure, so that the lifting ratio is 1:8. The first end of the rope is fixed to the supporting platform 4 and the second end is guided through the hoisting device 9 supported on the supporting platform to a reel 23, onto which the rope winds during the lifting when the hoisting device 9 moves the rope 10 through it.

The supporting platform comprises at least an upper beam 19 and a lower beam 18, which are fixed immovably in relation to each other and which enable the lifting of the entire supporting platform 4 at once as a unit with the apparatuses inside it (e.g. the hoisting machine 5 of the car 3). The elevator hoistway 1 is formed inside the building and is vertical and comprises concrete walls 20. The guide rails (not shown) of the elevator car in the part of the elevator hoistway 1 below the supporting platform 4 are already fixed to the walls of the elevator hoistway. Above the support structure, where the elevator hoistway is unfinished, the work to install the car guide rails can be performed from a working platform 15. The elevator under construction will come to form the final elevator of the building when the building is completed.

The high lifting ratio enables the use of a small hoisting device also in moving very large masses. The maximum 1:1 rated load of the hoisting device 9,9' dimensioned to be safe is preferably between 500-4000 kg, preferably 1500-4000 kg, even more preferably 2000-3000 kg, e.g. 2000 or 3000 kg. In this case with a simple arrangement an extensive hoisting capacity is achieved with a hoisting device of small size by selecting a lifting ratio from 1:(4,5,6,7,8,9,10,11 or 12). For example, with a lifting ratio of 1:8 with a hoist with a rated load of 2000 kg a hoisting capacity of 16000 kg is achieved (and with two such hoists 32000 kg), and with a hoist with a rated load of 3000 kg a hoisting capacity of 24000 kg is achieved (and with two such hoists 48000 kg). Thus a hoisting arrangement that is very powerful in its capacity is quick to produce and the placement of the hoisting device is freer because it does not take a lot of space. This is advantageous because, among other things, the reeving of a high lifting ratio in itself takes a lot of space. Another advantage is that the price and the deadweight of a small hoisting device are low. When the lifting ratio is even, an advantage is that the end of the rope and the machine can easily be fixed to the same structure. When the lifting ratio is 1:6, 1:8 or 1:10, a solution that is advantageous in its use of space is achieved, which has a large rated load, quick availability and portability, and also a low price.

The elevator arrangement comprises a second support structure 14 in the elevator hoistway above the support structure 6, and second hoisting means 21,22 for lifting the support structure 6 in the elevator hoistway while being supported on the second support structure 14. The second hoisting means 21,22 comprise a second hoisting device 21, which is preferably arranged to lift the support structure and/or an installation platform by means of a rope 22 with the lifting ratio of 1:1 or 2:1. The second hoisting means are also arranged to move a working platform 15 in the elevator hoistway 1 that is under construction in the part of the elevator hoistway 1 between the second support structure 14 and the support structure 6. When it is desired to perform a jump-lift, the second hoisting means are connected to the support structures and it is lifted upwards in the elevator hoistway. The amount of rope 10 needed in this case is released from the reel 23. When the support structure 6 is lifted to the height desired, it is locked to the walls 20 of the elevator hoistway 1, so that it can take the vertical support force needed for the lifting from the building. For this purpose the support structure comprises support means 8 extending inside the vertical projection of the wall of the elevator hoistway, upon which the support structure can be brought to rest. The support structure can be moved between an extended position and a contracted position, in which extended position the support means 8 extend inside the vertical projection of the wall of the elevator hoistway, and in which contracted position the support means 8 does not extend inside the vertical projection of the wall of the elevator hoistway enabling lifting. Each support means 8 is preferably connected to the support structure telescopically, but it could alternatively be in a folding manner. The supporting platform 6 preferably comprises corresponding support means 8, which operate in a corresponding manner.

The support structure and/or the supporting platform can take supporting force from the wall structure of the elevator hoistway directly and/or indirectly via the floor of the platform. For this purpose the wall 20 preferably comprises pockets that open towards the elevator hoistway extending inside the vertical projection of the wall. The pockets can be formed e.g. in the points of the seams of the elements of the elevator hoistway that are placed successively one above the other by forming a vertical indent in at least one of the elements placed end-to-end, in which case when stacking the elements a pocket P the size of the indent remains between the elements, on which pocket a part of the support structure can be supported by extending a part of the support structure inside the pocket. Thus the support structure extends inside the vertical projection of the wall of the elevator hoistway, and the support structure rests supported by the walls of the elevator hoistway. In points where there is no landing or other corresponding places for the support of the support means, all the support means 8 are supported on the wall 20 of the elevator hoistway 1, preferably by means of the pockets comprised in the wall elements.

Figure 2:
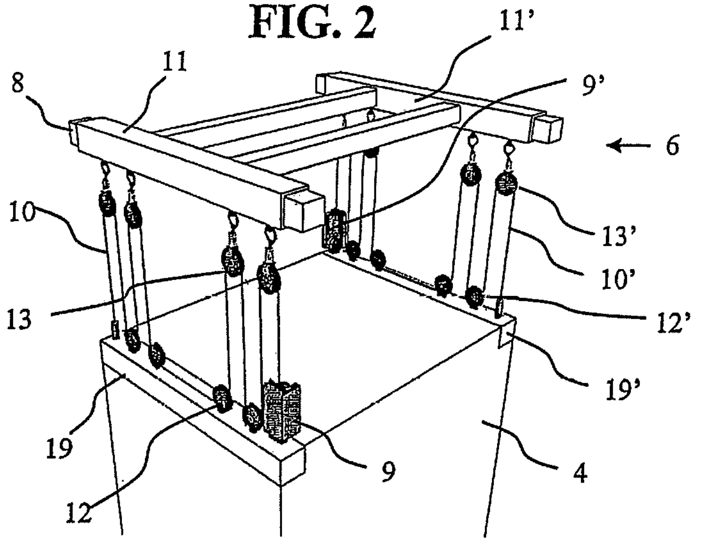
FIG. 2 presents a three-dimensional view of one preferred arrangement for lifting the supporting platform in the elevator arrangement and method according to the invention.

FIG. 2 presents a three-dimensional view of one preferred arrangement for lifting the supporting platform in the elevator arrangement and method according to the invention. In the embodiment presented, the hoisting means comprise a first hoisting device 9, and a second hoisting device 9', each of which are arranged to lift the supporting platform, with a rope 10,10' connected to the supporting platform and the support structure with a suitable lifting ratio (1:8 in the figure). The first hoisting device 9 and the second hoisting device 9' are disposed in opposite corners in the transverse direction of the elevator hoistway. The support structure 6 comprises two parallel horizontal beams 11, 11' at a distance from each other. A plurality of consecutive diverting pulleys 12,12' are supported on the horizontal beam 11,11' in the longitudinal direction of the horizontal beam, each of which diverting pulleys guides the rope coming up to the support structure from the supporting platform back down to the supporting platform 4. The supporting platform 4 comprises a plurality of consecutive diverting pulleys 13 in the longitudinal direction of the horizontal beam 19, which guide the rope coming down to the supporting platform 4 from the support structure 6 back upwards. The first end of the rope is fixed to the supporting platform 4, but it could alternatively be fixed to the support structure 6. The second end of the rope is guided through the hoisting device 9, which hoisting device is supported preferably on the supporting platform 4, but which could alternative be supported on the support structure 6. Supporting both the end of the rope and the hoisting device on the same structure, the supporting platform 4 or the support structure 6, however, speeds up the installation work. The aforementioned two horizontal beams 11 of the support structure 6 that are at a distance from each other comprise a support means 8 at both ends, which support means can be moved in the longitudinal direction of the horizontal beam 11 between an extended and a contracted position, preferably telescopically with the horizontal beam 11,11'.

Figure 3:
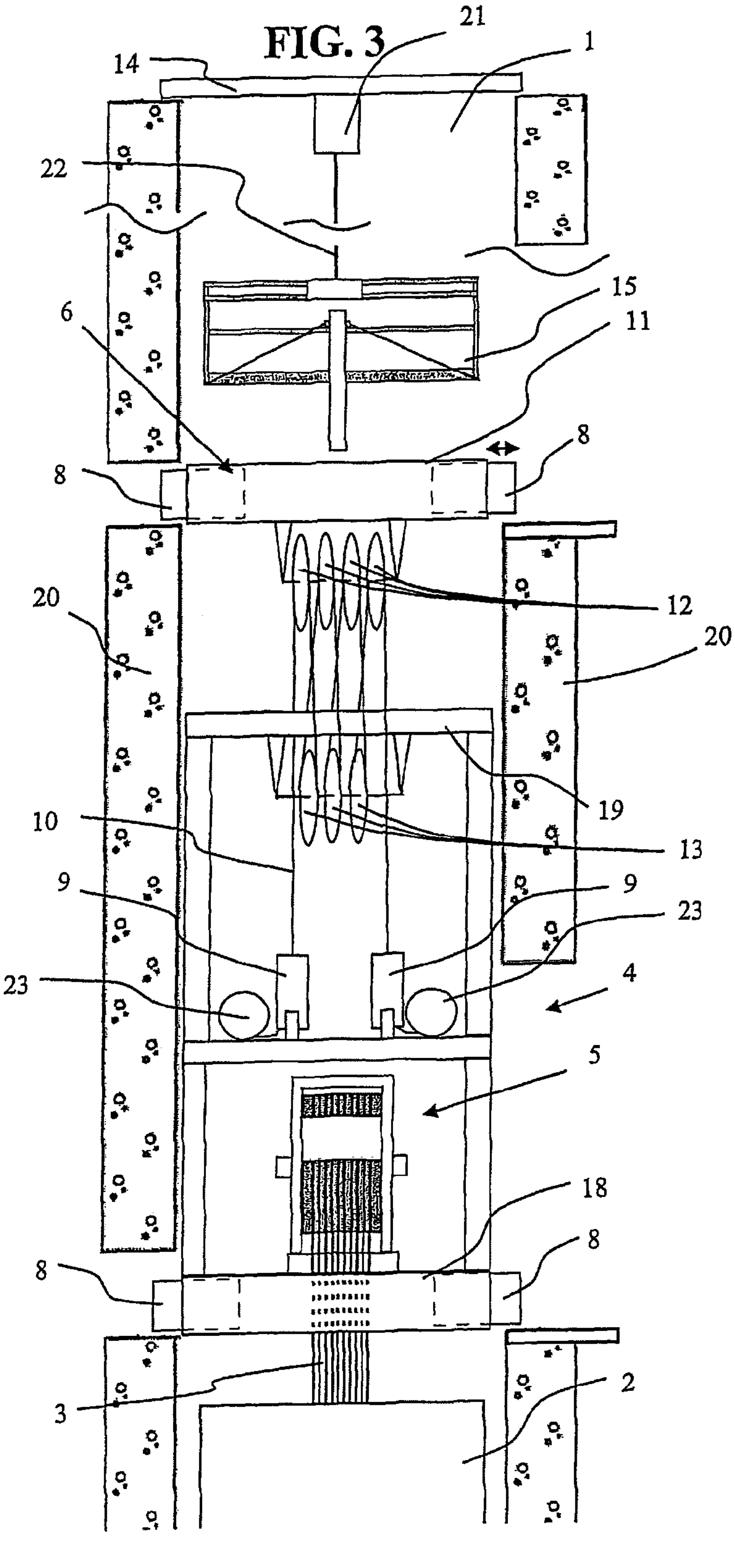
FIG. 3 presents a diagrammatic side view of a construction-time elevator arrangement of an elevator in a building according to a second embodiment of the invention, in which the lifting is arranged to be performed with a method according to the invention.

FIG. 3 presents a diagrammatic side view of a construction-time elevator arrangement of an elevator in a building according to a second embodiment of the invention, in which the lifting is arranged to be performed with a method according to the invention. The solution presented differs from the solution of FIG. 1 only in respect of the hoisting means (9,9',10,10'), which are arranged in a different way than in FIG. 1. But in other respects the solution of FIG. 3 operates as the solution of FIG. 1. In the embodiment presented, the rope 10 is pulled by means of two hoisting devices simultaneously. The hoisting devices are supported on the supporting platform 4, more particularly on the auxiliary platform comprised in the supporting platform, from where it is possible to do, among other things, work. The diverting pulleys 13 are supported on the upper beam of the supporting platform so that their axis of rotation is parallel with the upper beam 19. The diverting pulleys 12 and 13 are supported on the support structure and on the supporting platform 4 co-axially, in which case the diverting pulley set 12 and the diverting pulley set 13 each form a compact diverting pulley pack. In the solution it is preferred to dispose the diverting pulley sets 12 and 13 so that the diverting pulley trains/packs formed by the diverting pulley sets 12, 13 are aligned via the point that is the center of mass of the supporting platform as viewed from above. The support structure 6 comprises in this case preferably two parallel support beams 11, 11' at a distance from each other in the manner presented in FIG. 2. The beams 11 are fixed permanently to each other with horizontal beams arranged between the beams 11, to which the diverting pulley set 12 in the reeving according to FIG. 3 can be fixed so that the pack of co-axial diverting pulleys is disposed between the beams 11,11', preferably so that the centers of rotation of the diverting pulleys are aligned with the beams 11,11', in which case the beams can be situated close to each other.

Figure 4:
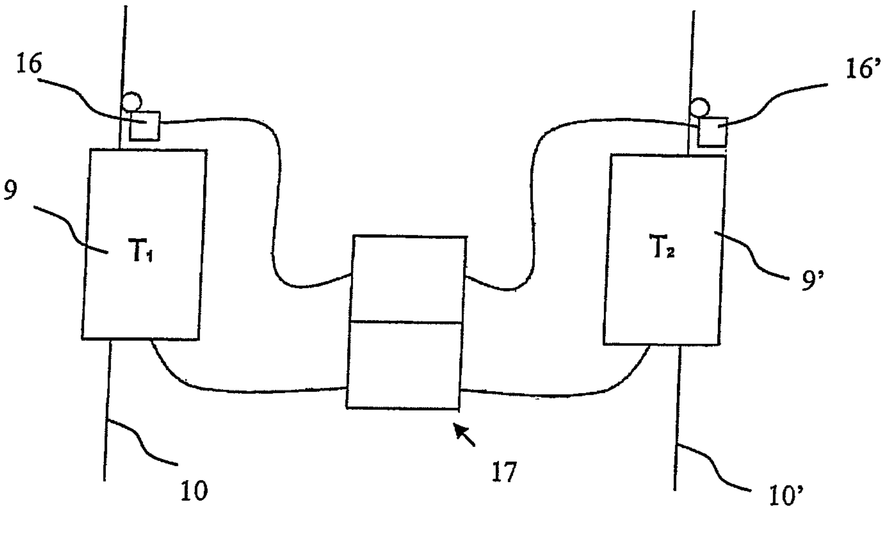
FIG. 4 presents a diagrammatic view of one preferred method of the invention to control the hoisting devices in the elevator arrangement and method according to the invention.

FIG. 4 presents a synchronization arrangement for the elevator arrangement according to the invention, which synchronization arrangement comprises two hoisting devices 9,9' and means 16,17 for synchronizing the hoisting speeds of the hoisting devices. The arrangement is suited particularly to synchronizing hoisting devices that move different hoisting ropes, such as to the solution of FIGS. 1 and 2. The means for synchronizing the hoisting speed of the hoisting devices 9 comprise means 16 for determining the speed of each hoisting device, preferably a tachometer that measures the speed of movement of the rope, a control unit (17) for comparing and controlling the hoisting speeds of the hoisting devices. An advantage of synchronization is that changing of the position of the supporting platform during the lifting caused by the speed difference of the hoisting devices can be avoided. The tachometer can be arranged to measure the speed of the rope by installing its rotor wheel to rest against the rope or against the traction sheave that rotates the rope. The synchronization arrangement of number of hoisting devices presented can also form a separate invention independent of the rest of the hoisting arrangement, in which case the other features presented in the application are not necessary.

In the method according to the invention in the use of a construction-time elevator, the supporting platform that supports the elevator car of the elevator is lifted higher in the elevator hoistway with hoisting means (9,9',10,10') supported on a support structure 6. In the method the supporting platform 4 of the elevator car 3 is suspended from the support structure 6 via at least one hoisting device 9,9' and rope 10,10' comprised in the hoisting means and the supporting platform 4 is lifted upwards in the elevator hoistway with a lifting ratio of 1:x, where x is greater than 1. In other words, the supporting platform at other times supported on the building is moved while supported by the hoisting means. After this it is lifted with the hoisting means higher in the elevator hoistway while being supported on the support structure. X is preferably some value between 4-12, preferably 6, 7, 8, 9 or 10, even more preferably 6, 8 or 10, most preferably of all 8. In the method the vertical support force needed for lifting is taken from the building by means of the support structure 6, which is supported on the wall structures of the elevator hoistway, preferably using the aforementioned support means 8.

FIGS. 1 and 3 present the situation in which a jump-lift has just been performed and rope has been reeled with the hoisting devices so that the supporting platform has risen to the proximity of the support structure 6. When it is desired to perform the next jump-lift, the second hoisting means are connected to the support structure 6 and the support structure 6 is lifted upwards in the elevator hoistway 1. The amount of rope 10 needed in this case is released from the reel 23. When the support structure is sufficiently high, it is locked to the walls 20 of the elevator hoistway, so that it can take the vertical support force needed for the lifting from the building. For this purpose the support structure comprises support means 8 extending inside the vertical projection of the wall of the elevator hoistway, upon which the support structure is brought to rest. After this the supporting platform starts to be supported with the hoisting device, after which its support means are moved to the contracted position and the supporting platform 4 is lifted. Preferably two hoisting devices that lift simultaneously are used in the lifting, the hoisting speed of which hoisting devices is synchronized. When the supporting platform is at a suitable height, its support means 8 are moved into the extended position, preferably so that they extend inside the vertical projection of the wall 20 of the elevator hoistway, e.g. into a pocket-like aperture comprised in the wall of the elevator hoistway, and the supporting platform 4 is lowered to be supported by the wall of the elevator hoistway, e.g. on the upward-facing surface of the aforementioned pocket/aperture. Between jump-lifts second hoisting means 21,22 are used to move a working platform 15 in the elevator hoistway 1 under construction between the second support structure 14 and the support structure 6. In the method the apparatuses described elsewhere in this application are preferably used in the manner described in connection with the figures (e.g. FIGS. 1,2,3,4).

Figure 5:
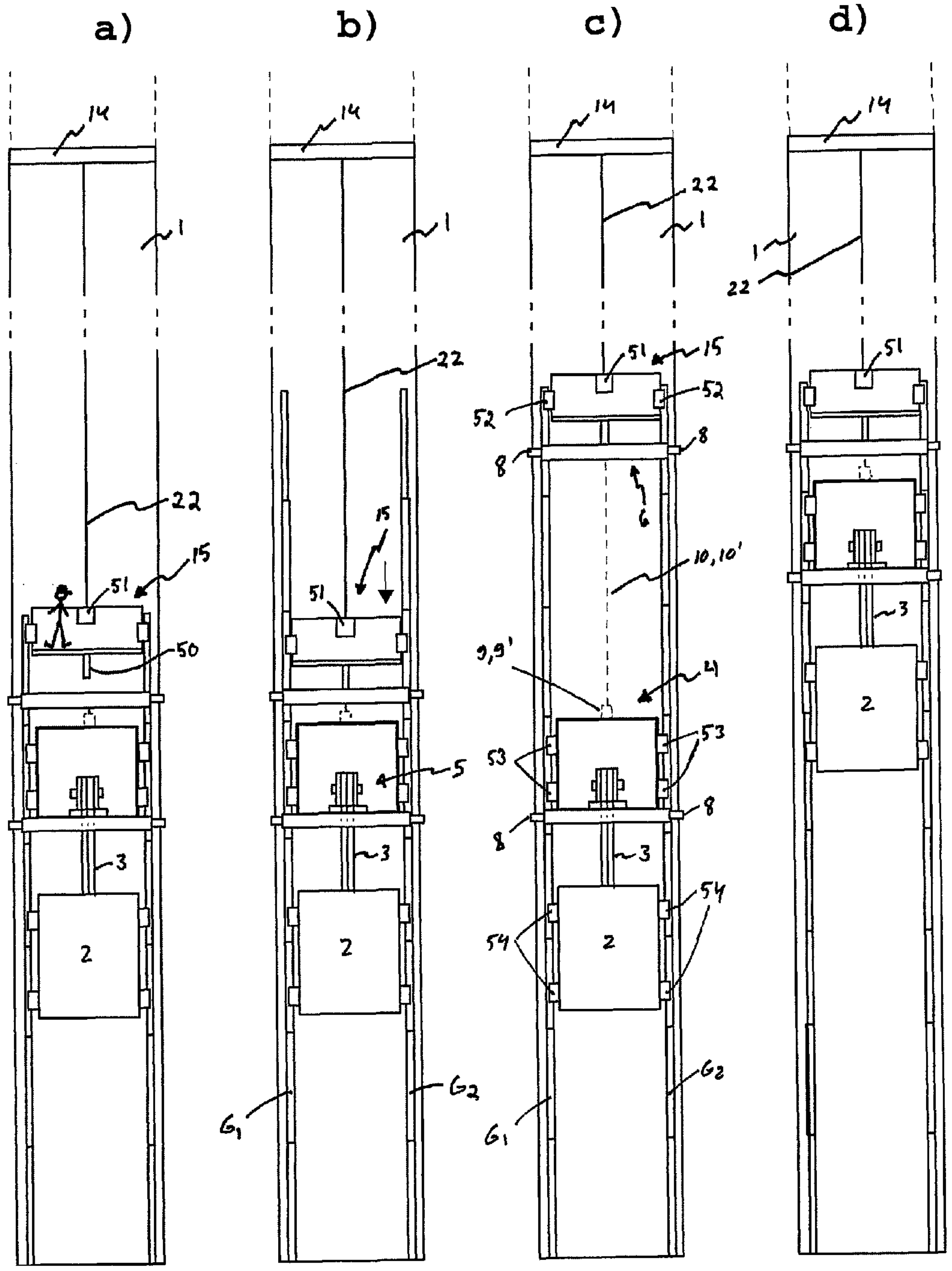
FIG. 5 presents a diagrammatic view of the method of the invention without showing details of the means for lifting the support platform.

In FIG. 5 further aspects of the method are showed without showing the details of means for lifting the supporting platform 4. FIG. 5*a* shows a situation between jump-lifts where the elevator car is in use to serve for moving passengers and/or goods between landings. The movable support structure 6 is above the supporting platform 4, at its proximity, in the elevator hoistway 1, where it is left in place after it has been used for lifting the supporting platform 4 to the proximity of the support structure 6 thus lifting the supporting platform 4 from its previous position higher in the elevator hoistway so as to extend the operating range of the elevator car 2 to reach higher in the elevator hoistway. In the situation showed if FIG. 5*a*, a working platform 15 movable in the elevator hoistway under construction, is used for installation work above levels of supporting platform 4 and support structure 6. Particularly, guide rails are installed in the elevator hoistway 1 to extend above the level of supporting platform 4 by working from said working platform 15 by installing additional guide rail sections on top of already installed guide rail sections, and thus making an already installed guide rail line to extend higher in the hoistway 1. After extending the guide rail line, said working platform 15 is lifted higher in the hoistway, and during the lift of the working platform it is guided by said guide rail sections just installed on top of already installed guide rails. After this, if still considered needed, additional guide rail section(s) can be installed on the guide rail sections previously installed by working from the working platform 15. So as to enable guiding of the working platform 15 along said guide rails during moving of the working platform 15 (up and/or down) during installation, it comprises guide elements 52, such as sliding guides or roller guides, which can correspond to ones used normally in elevator cars. The working platform 15 preferably also comprises a means for locking the working platform to the guide rails so as to ensure it stays stationary in place during installation work. The guide rail line or each guide rail line of a pair of guide rail lines extended in the manner as defined above, is preferably the same guide rail line $G_1$,$G_2$ along which the elevator car is in guidance moved below the supporting platform 4. In other words, the working platform 15 is used to extend the guide rail line $G_1$,$G_2$ both for guiding its own movement and the car 2 movement. Later when the range of movement will be extended to this height by one or more jump-lifts, the previously installed guide rail sections will be within the range of movement of the car 2. Preferably, the same guide rail line $G_1$,$G_2$ is also used for guiding the lift of the supporting platform 4, for which purpose the supporting platform 4 can have guide elements 53, such as sliding guides or roller guides, which can correspond to ones commonly used in elevator cars. For moving the working platform 15 in the elevator hoistway under construction a second support structure 14 and a second hoisting means (21,22,51) are placed above the support structure 6. The working platform 15 is thus arranged to be moved between the second support structure 14 and the support structure 6. The hoisting means comprise preferably a second hoisting device 21,51 in unity of the working platform or in unity of the second support structure 14, most preferably in unity of the working platform so as to make its use easy for person on the platform 15. The a second hoisting device 21,51 is preferably arranged to lift the support structure 6 and/or the installation platform by means of a rope 22, preferably with a lifting ratio of 1:1 or 2:1.

FIG. 5*b* shows a situation where the guide rail lines $G_1$,$G_2$ are already installed to extend far (at least 1 floor height, preferably more floor heights) above the supporting platform 4 and also far above the support structure 6. In this phase the preparation for lifting of supporting platform 4 is substantially started by moving the support structure 6 upwards in the hoistway, so as to increase the distance between support structure 6 and supporting platform 4 and thus make the distance adequate for enabling desired height of the following lift of the supporting platform 4. The second support structure 14 and hoisting means (21,22,51), which were earlier used for moving the working platform 15 are in the method used for lifting the support structure 6 upwards in the elevator hoistway. This makes the method efficient in time, space and economy. Particularly, this can be done by driving the working platform 15 downwards to the proximity of said support structure 6. After this, the working platform 15 and support structure 6 are connected together by fixing the working platform 15 to the support structure, so as to enable simultaneous lifting of them. This can be done e.g. by fixing means 50 protruding downwards from the working platform 15. After this, the support means 8 of the support structure 6 are moved to a position where they allow vertical moving of the support structure (descent), e.g. the support means 8 are contracted. After this, the working platform 15 and the support structure 6 are lifted simultaneously with common means upwards in the hoistway. During this lift, the working platform is guided along said guide rail lines $G_1$,$G_2$. The support structure may also have guide elements, such as sliding guides or roller guides, which can correspond to ones commonly used in elevator cars, for guiding it along said guide rails. This is, however, not necessary, as it is connected to another guided structure, i.e. to the working platform 15. Although preferable, it is not necessary that the working platform 15 and support structure are lifted simultaneously. If they are not simultaneously lifted, the support structure preferably comprises said guide elements. In FIG. 5 the hoisting means for lifting the supporting platform 4 are not showed with detail, but they can be as described/depicted elsewhere, such as means 9,9',10,10'. Also other type of hoisting means could be used to achieve benefits of another aspect of invention. In that case, during the lift rope 10,10' needed is simultaneously released from the reel 23 and thus maintained the supporting platform 4 and support structure 6 connected to each other with the hoisting means 9,9',10,10'. After the support structure is lifted to a higher position, it is supported at place by moving its support means 8 into position where don't allow vertical moving (descent) of the support structure 6, e.g. they are in extended position. FIG. 5*c* shows the situation after lifting of the support structure 6 when it is mounted to be stationary in the elevator hoistway and the system is ready for lifting of the supporting platform 4. The rope 10,10' is showed to be extended and the connection maintained as described above. After this, the support means of the supporting platform 4 are moved into position allowing vertical moving (ascend) of the supporting platform 4 in the hoistway. The hoisting means can be used to shift the weight away from the support means so as to enable said position change. After this, the supporting platform 4 is lifted with the hoisting means (9,9',10,10') upwards in the elevator hoistway supported by the support structure 6. This is preferably done as described anywhere else in the application. More specifically, it is also preferable that during the lifting of the supporting platform 4, it is guided along the same guide rail line $G_1$,$G_2$ that is used for guiding the car 2 and the working platform 15 and possibly also the support structure 6, when each component is at its turn being moved vertically in the hoistway. Thus, an overall system is achieved which is efficient in space, installation time and economy. FIG. 5*d* shows a situation after the lifting of the supporting platform 4. After the lift the support means 8 have been moved to position not allowing vertical movement (descent) of the supporting platform 4. After reaching the situation of FIG. 5*d*, the car 2 can be again returned to use to serve in moving passengers and/or goods between landings, but this time with a movement range, which extends higher than before the jump-lift. The process can then be started again correspondingly as in FIG. 5*a*, but this time higher in the hoistway 1. These cycles can be repeated until the lifting height of the car has reached a desired altitude. The elevator can then be converted to form the final elevator of the building. This conversion may comprise changes to the construction time elevator but preferably keeping one or more of car 2, guide rails of said guide rail line(s) $G_1$,$G_2$, counterweight, said means 5 for moving the hoisting roping, roping 3, supporting platform 4.

In carrying out the method steps depicted and described related to FIG. 5, although preferable, it is not necessary, that the support structure and/or supporting platform is supported with the means 8 of the type as showed, but alternatively another kind of support means could be used. To carry out this aspect of the invention, the support means could be of the type that takes support from the guide rails. In FIG. 5, the frame and supporting means of the supporting platform 4 and support structure 6 extend to the pockets or corresponding structures formed in the hoistway walls and overtake the guide rail lines $G_1$,$G_2$ so that the guide rail lines can extend continuously past these structures.

In this application the term rope refers to a rope, chain, belt or some other corresponding. Most preferably the rope is however a metal wire rope. It is obvious to the person skilled in the art that the invention is not limited to the embodiments described above, in which the invention is described using examples, but that many adaptations and different embodiments of the invention are possible within the frameworks of the inventive concept defined by the claims presented below. Thus, for example, it is obvious that the hoisting machine 5 that moves the elevator car 2 does not necessarily need to be on the supporting platform, but alternatively it can be also elsewhere, such as e.g. at the bottom end of the elevator hoistway. It is obvious that during a jump-lift the elevator car can be lifted along with the supporting platform, or it can be locked in the elevator hoistway.

What is claimed is:

1. A method in installing an elevator used during construction-time, wherein the construction-time elevator comprises:
- an elevator hoistway;
- an elevator car;
- hoisting roping for moving the elevator car in the elevator hoistway;
- a supporting platform for supporting the elevator car below the supporting platform via the hoisting roping;
- a mechanism configured to move the hoisting roping;
- a movable support structure above the supporting platform in the elevator hoistway;
- a hoisting device supported by the support structure and configured to lift the supporting platform upwards in the elevator hoistway; and
- a working platform movable in the elevator hoistway under construction above said movable support structure, said method comprising the steps of:
- performing at least two lifts;
- in each of said lifts, lifting the supporting platform higher in the elevator hoistway with said hoisting device supported by the support structure so as to extend the operating range of the elevator car to reach higher in the elevator hoistway;
- using a second support structure and a second hoisting device, which are above the support structure, between said lifts of the supporting platform, for moving the working platform in the elevator hoistway under construction between the second support structure and the support structure, and for lifting the support structure upwards in the elevator hoistway.

2. The method according to claim 1, further comprising the steps of:
- using the second support structure and the second hoisting means for lifting the support structure so that before lifting of the supporting platform, the support structure is suspended from the second support structure and the second hoisting device, which is above the support structure in the elevator hoistway; and
- lifting the support structure upwards in the elevator hoistway with said second hoisting device while being supported on the second support structure.

3. The method according to claim 1, further comprising the step of installing guide rails in the elevator hoistway to extend above the supporting platform.

4. The method according to claim 1, further comprising the steps of:
- installing guide rails in the elevator hoistway to extend above the supporting platform; and
- moving the working platform guided along said guide rails.

5. The method according to claim 1, wherein said guide rails are part of the same guide rail line that is used to guide the car.

6. The method according to claim 1, further comprising the step of installing guide rails in the elevator hoistway to extend above the supporting platform by installing new guide rail sections on top of the guide rail line used for guiding the car below the supporting platform.

7. The method according to claim 1, further comprising the step of installing guide rails in the elevator hoistway to extend above the level of the supporting platform by working from said working platform.

8. The method according to claim 1, further comprising the steps of:
- installing guide rails in the elevator hoistway to extend above the supporting platform; and
- moving the working platform upwards guided along said guide rails, after which guide rail sections are installed on top of the guide rail sections previously installed.

9. The method according to claim 1, wherein the working platform comprises guide elements for guiding the working platform along guide rails.

10. The method according to claim 1, further comprising the steps of:
- connecting said second hoisting device to the support structure;
- after said step of connecting, lifting the support structure upwards in the elevator hoistway;

after said step of lifting the support structure upwards, supporting the support structure by moving a support device of the support structure into position where descent of the support structure is prevented; and after said step of supporting the support structure, lifting the supporting platform with the hoisting device upwards in the elevator hoistway supported by the support structure.

11. The method according to claim 1, further comprising the step of using the second support structure and the second hoisting device, which are above the support structure, to lift both the support structure and the working platform simultaneously upwards in the elevator hoistway.

12. The method according to claim 1, further comprising the steps of:

connecting said second hoisting device to the support structure by driving said working platform to the proximity of said support structure and fixing said working platform to the support structure; and after said step of connecting the second hoisting device, simultaneously lifting the support structure and the working platform upwards in the elevator hoistway.

13. The method according to claim 1, wherein the supporting platform comprises guide elements for guiding the supporting platform along guide rails, said method further comprising the step of lifting the supporting platform along guide rails with the hoisting device upwards in the elevator hoistway supported by the support structure.

14. A method in installing an elevator used during construction-time, wherein the construction-time elevator comprises:

an elevator hoistway;

an elevator car;

hoisting roping for moving the elevator car in the elevator hoistway;

a supporting platform for supporting the elevator car below the supporting platform via the hoisting roping;

a mechanism configured to move the hoisting roping;

a movable support structure above the supporting platform in the elevator hoistway;

a hoisting device supported by the support structure and configured to lift the supporting platform upwards in the elevator hoistway; a second support structure and a second hoisting device;

a working platform movable in the elevator hoistway under construction above said movable support structure; and one or more guide rail lines for guiding the elevator car, said method comprising the steps of:

lifting the supporting platform higher in the elevator hoistway with said hoisting device supported by the support structure so as to extend the operating range of the elevator car to reach higher in the elevator hoistway;

after said step of lifting, lifting said support structure above the supporting platform upwards;

during the method, extending said one or more guide rail lines by installing one or more guide rail sections on top of an already installed guide rail line;

lifting said supporting platform higher in the elevator hoistway guided along said one or more guide rail lines;

moving said working platform guided along said one or more guide rail lines; and using the second support structure and the second hoisting device, which are above the support structure, for moving the working platform in the elevator hoistway under construction between the second support structure and the support structure, and for lifting the support structure upwards in the elevator hoist way.

15. The method according to claim 14, further comprising the step of using said working platform for said step of installing said one or more guide rail sections on top of an already installed guide rail line.

16. The method according to claim 14, further comprising the step of lifting the support structure above the supporting platform upwards guided along said one or more guide rail lines.

17. The method according to claim 14, wherein the supporting platform, the working platform and the elevator car each comprise guide elements fitted to run along said one or more guide rail lines.

* * * * *